US008539824B2

(12) United States Patent
Van Nieuwstadt et al.

(10) Patent No.: US 8,539,824 B2
(45) Date of Patent: Sep. 24, 2013

(54) METHOD TO DETECT AND MITIGATE UNSOLICITED EXOTHERMS IN A DIESEL AFTERTREATMENT SYSTEM

(71) Applicant: Ford Global Technologies, LLC, Dearborn, MI (US)

(72) Inventors: Michiel J. Van Nieuwstadt, Ann Arbor, MI (US); Jian Kong, Canton, MI (US); Christopher Oberski, Plymouth, MI (US); Norman Hiam Opolsky, West Bloomfield, MI (US); Kirk Andrew Parrish, Grass Lake, MI (US); James Bromham, Trowbridge (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/853,505

(22) Filed: Mar. 29, 2013

(65) Prior Publication Data

US 2013/0213012 A1 Aug. 22, 2013

Related U.S. Application Data

(63) Continuation of application No. 12/511,560, filed on Jul. 29, 2009, now Pat. No. 8,408,055.

(51) Int. Cl.
*G01M 15/00* (2006.01)

(52) U.S. Cl.
USPC .......................................... 73/114.73; 73/114

(58) Field of Classification Search
USPC ................................................ 73/114, 114.73
See application file for complete search history.

(56) References Cited

U.S. PATENT DOCUMENTS

| | | | | |
|---|---|---|---|---|
| 6,988,361 | B2 * | 1/2006 | van Nieuwstadt et al. | 60/295 |
| 7,137,246 | B2 * | 11/2006 | van Nieuwstadt et al. | 60/295 |
| 2008/0256935 | A1 * | 10/2008 | Oger et al. | 60/299 |

* cited by examiner

*Primary Examiner* — Lisa Caputo
*Assistant Examiner* — Jamel Williams
(74) *Attorney, Agent, or Firm* — Julia Voutyras; Alleman Hall McCoy Russell & Tuttle LLP

(57) ABSTRACT

Methods for monitoring and detecting undesired exotherms which may occur in an exhaust aftertreatment system coupled to a lean burning combustion engine are described. In one particular approach, an undesired exotherm may be indicated based on an expected oxygen depletion along a length of an exhaust aftertreatment system in the direction of exhaust gas flow of exhaust gas. For example, during DPF regeneration, a certain amount of oxygen is expected to be utilized for removing soot. If less oxygen is actually found in the exhaust downstream of the exhaust system, then an undesired exotherm may be present, as unintended reductant may be present in the exhaust and reacting exothermically with oxygen. Various mitigation actions may then be initiated in response to the indication of an undesired exotherm.

17 Claims, 5 Drawing Sheets

METHOD TO DETECT AND MITIGATE UNSOLICITED EXOTHERMS IN A DIESEL AFTERTREATMENT SYSTEM

CROSS REFERENCE TO RELATED APPLICATIONS

The present application is a continuation of U.S. patent application Ser. No. 12/511,560 filed Jul. 29, 2009, the entire contents of which is incorporated herein by reference for all purposes.

FIELD

The present invention relates to exhaust aftertreatment systems coupled to lean burning combustion engines.

BACKGROUND AND SUMMARY

Various methods may be used for controlling the regeneration rate in aftertreatment devices such as diesel particulate filters (DPF) and lean NOx traps (LNT) by metering the oxygen flow through the exhaust aftertreatment system to prevent excessive temperatures which may degrade the aftertreatment devices (see U.S. Pat. No. 6,988,361 and U.S. Pat. No. 7,137,246).

However, the inventors herein have recognized that with such approaches, adjustments in oxygen concentration of one device may cause an undesired exotherm in another device. For example, adjusting the oxygen flow to the DPF during regeneration to manage temperature conditions in the DPF may cause undesired exotherms in a diesel oxidation catalyst (DOC) or a selective catalytic reducing catalyst (SCR) if present in the exhaust aftertreatment system. Alternatively, the inventors herein have recognized that an undesired exotherm may also be caused by various leaks in the engine or exhaust, such as coolant leaks (coolant entering the exhaust and providing reductant), fuel injectors leaks (unintended fuel entering the engine/exhaust system and providing reductants), or a turbo bearing leak.

The inventors herein have recognized the advantage of identifying undesired exotherms in the aftertreatment system during engine operation and initiating mitigating actions in response to the detection of an undesired exotherm. The method may comprise: identifying an undesired exotherm based on an expected oxygen depletion along a length of the exhaust system in a direction of exhaust gas flow of exhaust gas, and; initiating mitigating actions in response to an identified undesired exotherm. For example, the undesired exotherm may be identified based on an expected oxygen concentration taking into account whether a particulate filter region of the exhaust system is regenerating, and if so, to what extent.

In this way, even if filter regeneration can be controlled via adjustments to oxygen concentration in the exhaust, the system is still able to identify if another region of the exhaust system, away from the particulate filter regeneration, is experiencing an undesired exotherm, and thus may be reaching an over-temperature condition. Further, if one or more engine or exhaust components is leaking and causing an undesired exotherm, it is possible to identify the situation even when the oxygen concentration may be controlled to a desired value.

In such an approach, various mitigating actions can be initiated, including reducing fuel rail pressure, adjusting exhaust air-fuel ratio, adjusting injection timing, adjusting torque limit, inducing misfire, modifying urea injection quantity, etc.

As such, it may be possible to address the risk of undesired exotherms occurring from combustible material in the exhaust reacting with excess oxygen due to the primarily lean conditions in exhaust systems, such as diesel systems, when the exhaust is at sufficiently high temperatures, even during controlled particulate filter regeneration operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
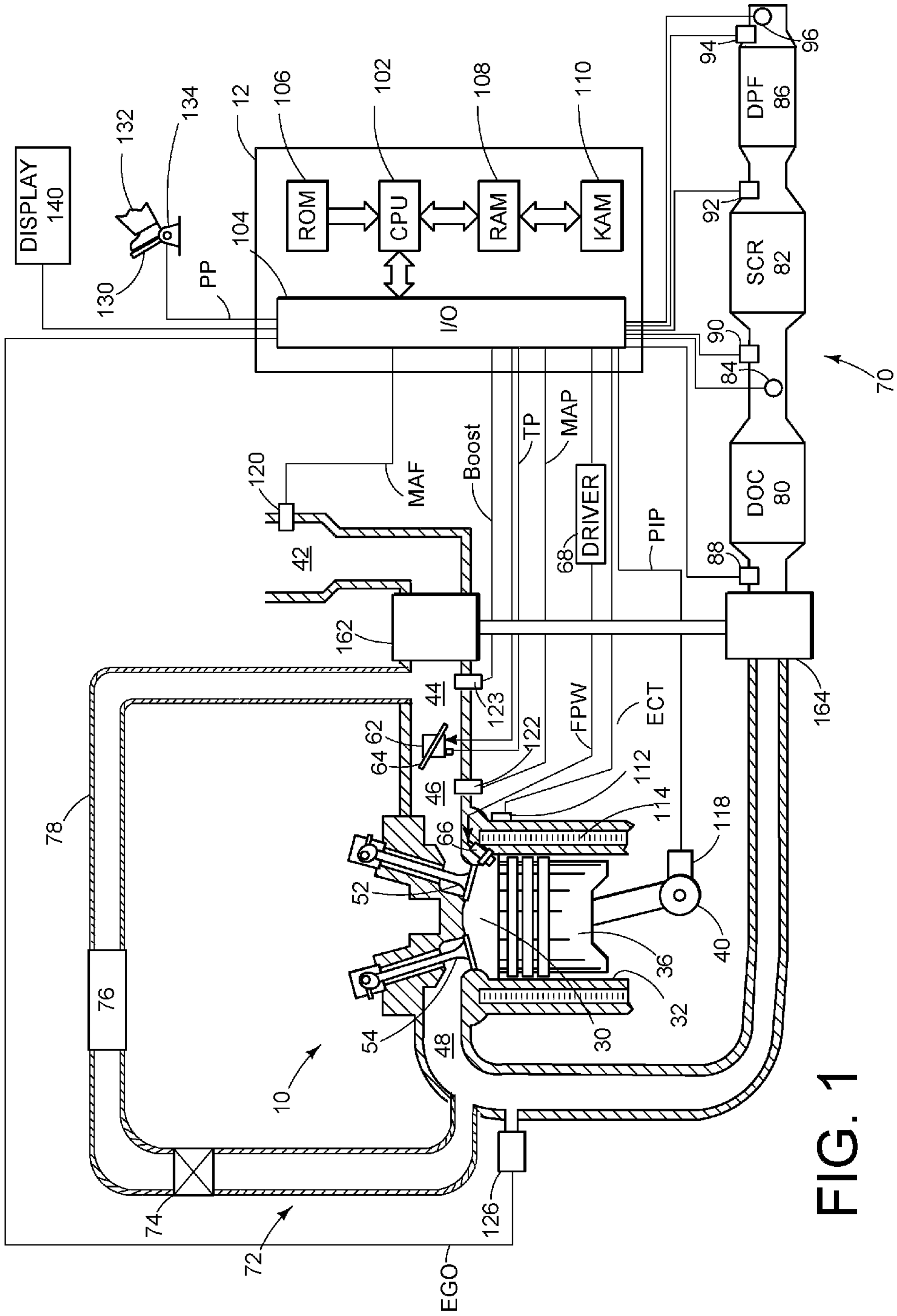
FIG. 1 shows a combustion engine with an exhaust aftertreatment system.
Figure 2:
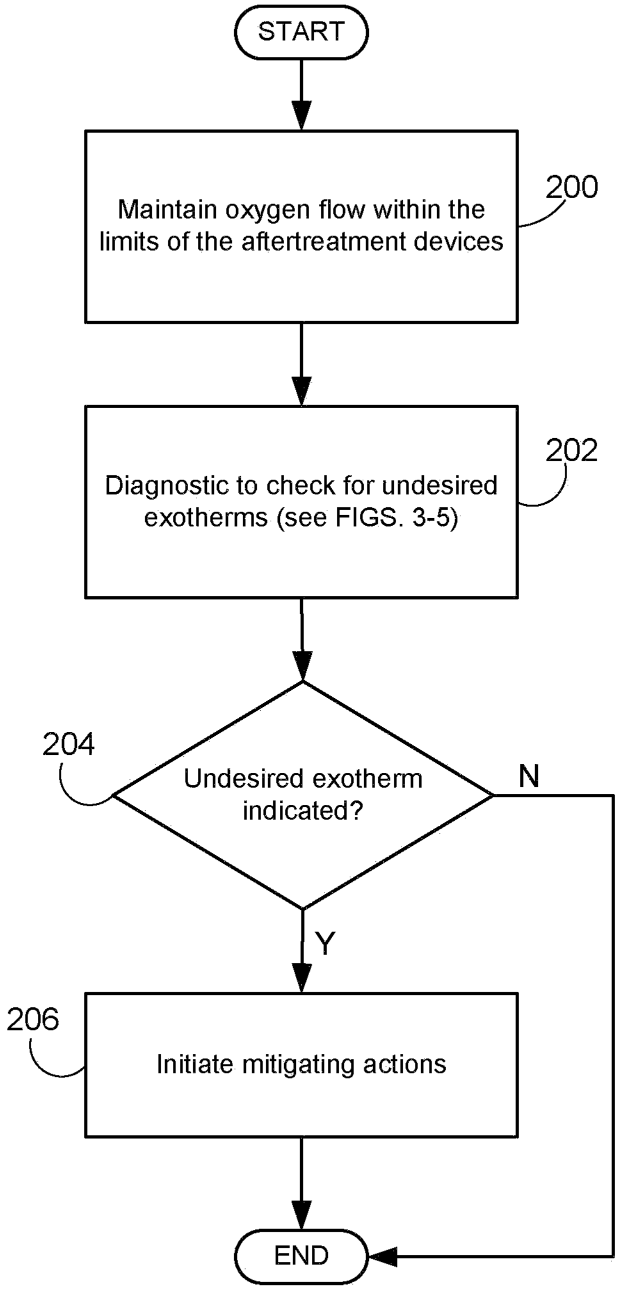
FIG. 2 shows a general control routine for monitoring an exhaust aftertreatment system.
Figure 3:
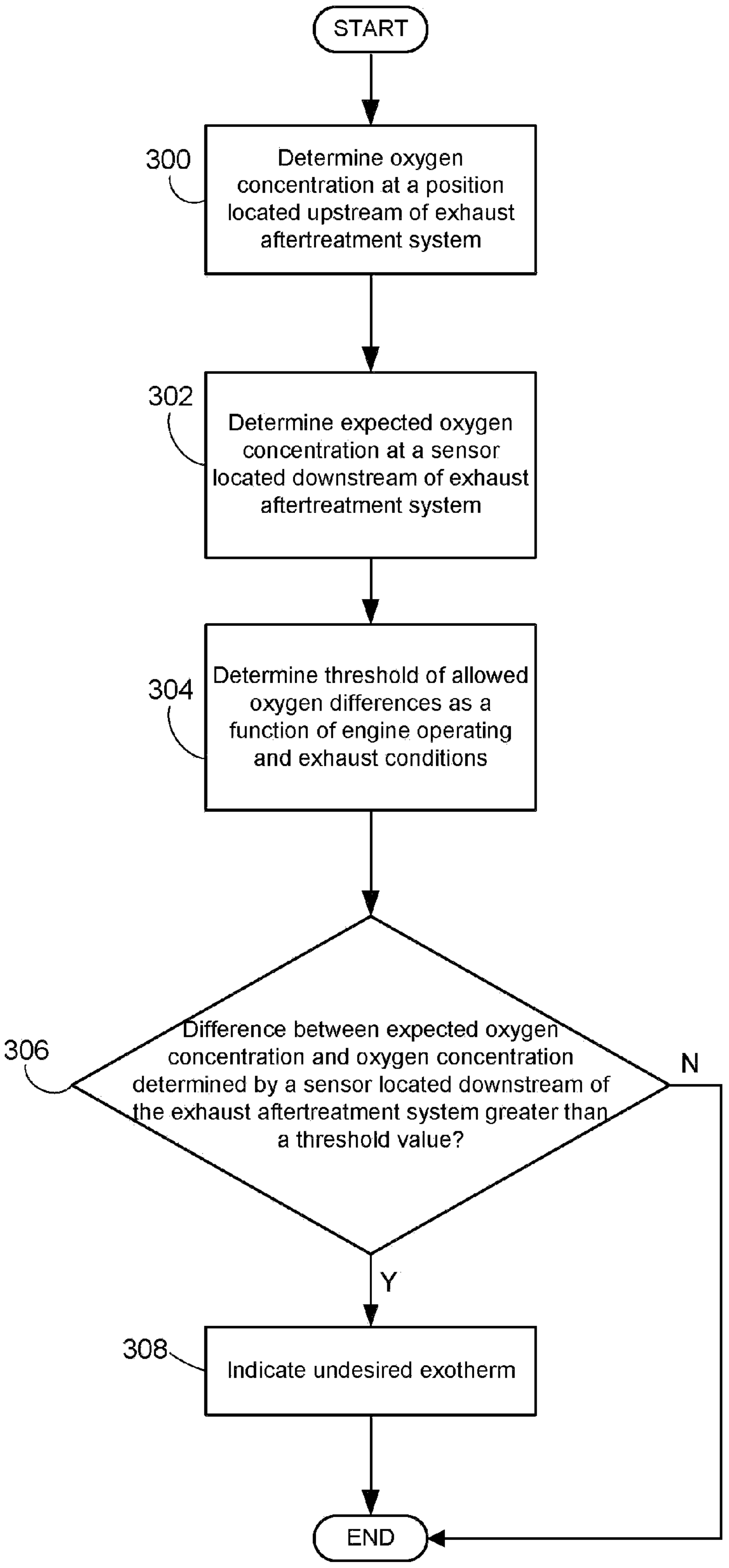
FIGS. 3-5 show control routines for diagnosing undesired exotherms.
Figure 4:
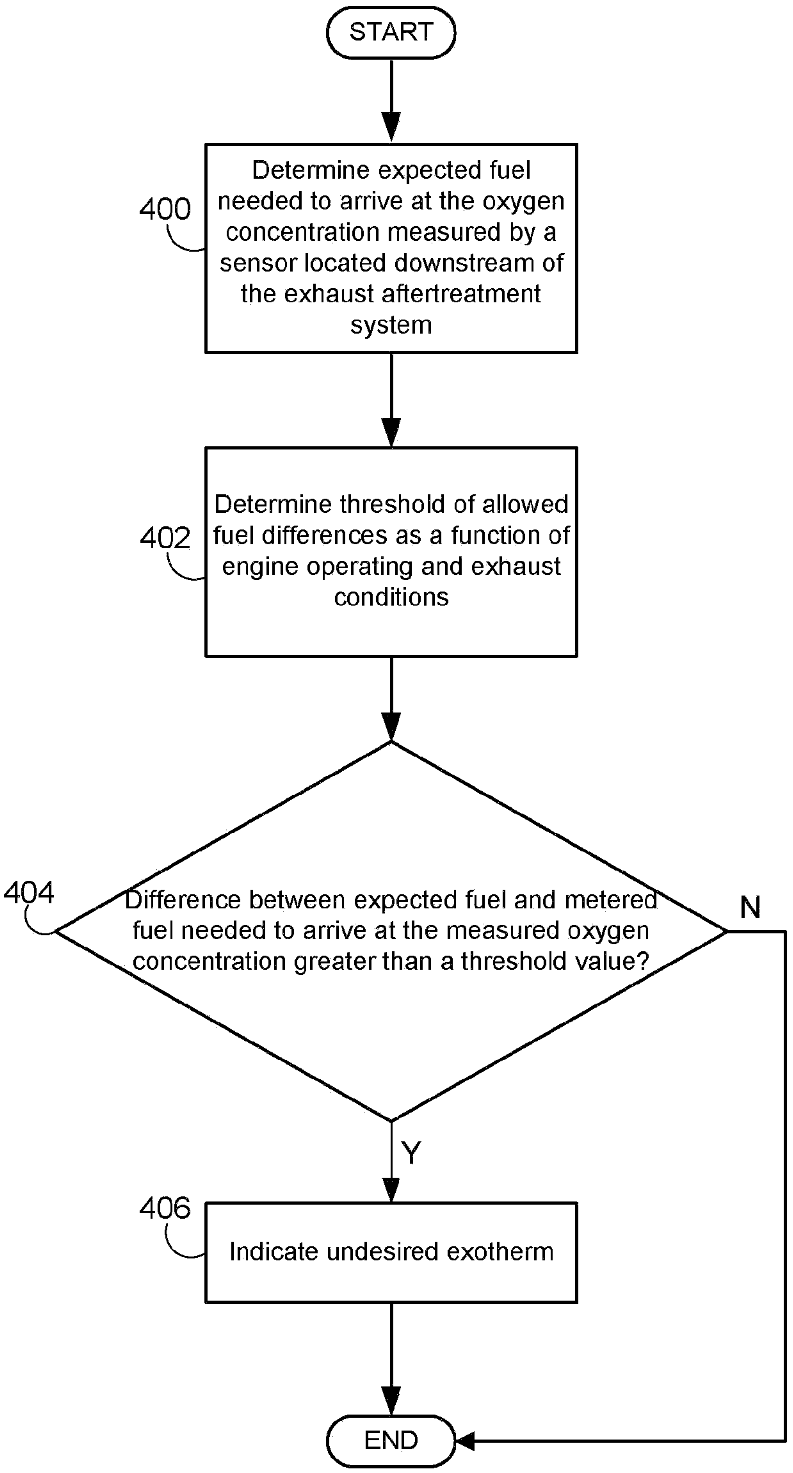
Figure 5:
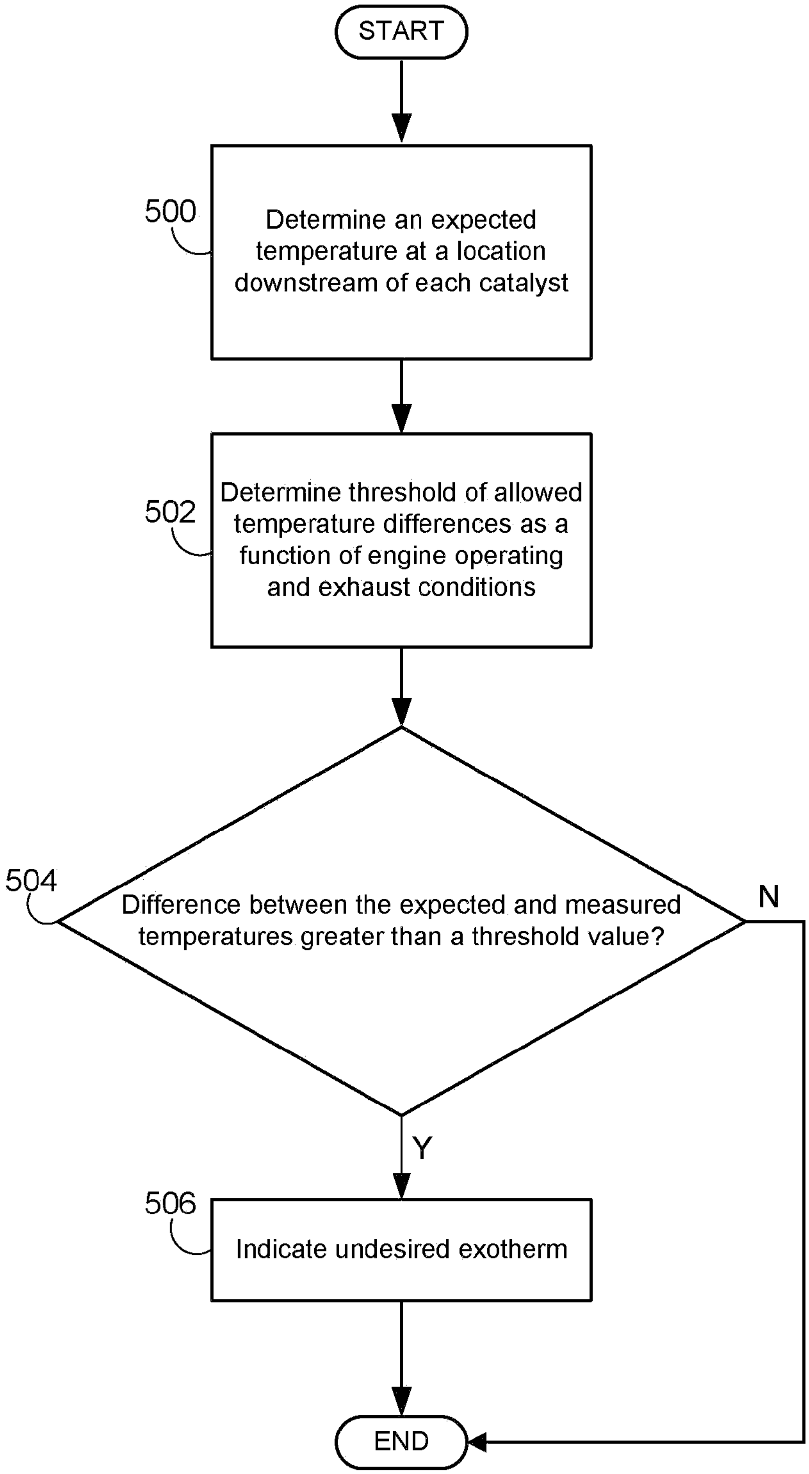

The following description relates to methods of monitoring and detecting undesired exotherms which may occur in an exhaust aftertreatment system coupled to a lean burning combustion engine, for example a diesel engine, such as shown in FIG. 1. The exhaust gas aftertreatment system shown coupled to a combustion engine in FIG. 1 may include a plurality of emission control devices, each of which may carry out an exothermic reaction with excess oxygen present in the exhaust during selected conditions (e.g., selected temperatures). An example method for controlling and monitoring oxygen content in an exhaust aftertreatment system is shown in FIG. 2. The routine shown in FIG. 2 includes a method for controlling the regeneration rate in aftertreatment devices and a method for monitoring and detecting undesired exotherms in an exhaust aftertreatment system which may not be prevented or sufficiently managed by the regeneration control routine. FIGS. 3-5 show various embodiments of the diagnostic routine which monitors for and detects undesired exotherms in the exhaust aftertreatment system as a whole during engine operation. In contrast to the regeneration control routine included in FIG. 2, the diagnostic routines shown in FIGS. 3-5 may indicate undesired exotherms even when faults occur in the regeneration control routines. Further, in response to the indication of undesired exotherms by the diagnostic routines shown in FIGS. 3-5, mitigating actions may be initiated even when the source and/or location of the exotherm is not fully known. For example, while an undesired exotherm may be caused by higher or lower oxygen concentrations entering the exhaust aftertreatment system, the undesired exotherm may also be caused by various faults in engine and/or exhaust components; for example a coolant leak, a turbo bearing leak, or a fuel injector leak (in-cylinder or in exhaust). In this way, it is possible to address the risk of undesired exotherms occurring from combustible material in the exhaust reacting with excess oxygen due to primarily lean conditions in exhaust systems, such as diesel systems, when the exhaust and/or exhaust components are at sufficiently high temperatures.

Turning now to FIG. 1, a schematic diagram showing one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Combustion chamber 30 or one or more other combustion chambers of engine 10 may be operated in a compression ignition mode, with or without an ignition spark. Further, engine 10 may be turbocharged by a compressor 162 disposed along the intake manifold 44 and a turbine disposed along the exhaust passage 48 upstream of the exhaust aftertreatment system 70.

Exhaust gas sensor 126 is shown coupled to exhaust passage 48 upstream of an exhaust gas aftertreatment system 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. An exhaust gas recirculation system (EGR) 72 may be coupled to exhaust passage 48. The EGR system may include an EGR valve 74 and an EGR cooler 76 disposed along the EGR conduit 78.

The exhaust gas aftertreatment system 70 may include a plurality of emission control devices, each of which may carry out an exothermic reaction with excess oxygen present in the exhaust during selected conditions (e.g., selected temperatures). For example, the exhaust gas aftertreatment system 70 may include a DOC 80 disposed along exhaust gas conduit 48 downstream of turbine 164. An SCR 82 may be disposed along the exhaust gas conduit downstream of DOC 80. A urea sprayer 84 (or any suitable ammonia source) may be disposed upstream of SCR 82 and downstream of DOC 80. A DFP 86 may be disposed along the exhaust conduit downstream of SCR 82. Temperature sensors 88, 90, 92, and 94 may be disposed at points along the exhaust gas conduit both upstream and downstream of each aftertreatment device in the aftertreatment system 70. Further, an oxygen sensor 96 (e.g., an UEGO sensor) may be disposed downstream of the exhaust aftertreatment system 70. It should be understood that exhaust aftertreatment system 70 may include a plurality of aftertreatment device configurations not shown in FIG. 1. In one example, the exhaust aftertreatment system may include a DOC only. In another example, the exhaust aftertreatment system may include a DOC followed downstream by a DPF. In another example, the exhaust aftertreatment system may include a DOC followed downstream by a DPF then and SCR. In still another example, SCR 82 shown in FIG. 1 may be replaced with an LNT. Further, the order of the different catalysts and filters in the exhaust aftertreatment system may also vary. The number of temperature sensors disposed within the exhaust aftertreatment system may vary according to the application. Though the oxygen sensor (96) is shown in FIG. 1 at a point located downstream of exhaust aftertreatment system 70, it may be located upstream of any of the bricks in the aftertreatment system 70, in which case it can only monitor the catalyst bricks upstream of it.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Additionally, controller 12 may communicate with a cluster display device 140, for example to alert the driver of faults in the engine or exhaust aftertreatment system.

Though FIG. 1 shows only one cylinder of a multi-cylinder engine, each cylinder may similarly include its own set of intake/exhaust valves, fuel injector, spark plug, etc.

Turning now to FIG. 2, a general control routine for monitoring an exhaust aftertreatment system during engine operation is shown. At 200, oxygen flow through the exhaust aftertreatment system is maintained within the limits of the aftertreatment devices in the aftertreatment system. For example, engine operating parameters may be adjusted so as to limit the exothermic reactions during regeneration events in the aftertreatment devices. The amount of excess oxygen entering an aftertreatment device undergoing regeneration may be controlled to prevent the temperature of the device from becoming greater than a threshold value which will degrade the device. The control routine at 200 may include monitoring the temperature of each aftertreatment device using a temperature sensor and using a signal from an oxygen sensor upstream of each device to control the regeneration rate by metering the oxygen flow sensed by the sensor. In one specific example, a desired excess oxygen flow is determined based on catalyst temperature, and excess oxygen flow is adjusted by adjusting engine operation in response to measured excess oxygen in the exhaust at one or more locations.

At 202, a diagnostic routine is used to monitor for and detect undesired (e.g., unintended) exotherms occurring in the aftertreatment system during engine operation. FIGS. 3-5 described below herein, show various embodiments of the diagnostic routine which monitors for and detects undesired exotherms in the exhaust aftertreatment system during engine operation. The oxygen flow control routine at 200 operates to reduce potentially degrading excessive temperatures for each device in the aftertreatment system but does not, by itself, provide identifying or detecting of undesired exotherms in the aftertreatment system, in part or as a whole. The detection routine 202 monitors the exhaust aftertreatment system for undesired exotherms which may occur in other locations in the exhaust system away from particulate filter regeneration events, for example. In another example, the undesired exotherm may be due to over-temperature events occurring in a plurality of aftertreatment devices. Therefore the oxygen flow adjustments made at 200 may not be sufficient to reduce unwanted exotherms. Furthermore, adjusting the oxygen flow at 200 in response to a regeneration event in a first device may cause an undesired exotherm in a second device. For example adjusting the oxygen flow at 200 to provide a desired amount of excess oxygen to a regenerating DPF may cause undesired exotherms in a DOC or an SCR if present.

Thus, the diagnostic routine at 202 may be used to identify degradation in the control routines at 200, including the generation of unintended exotherms in the exhaust system. If undesired exotherms are not detected by the diagnostic routine at 204, then the routine ends. However, if undesired exotherms are detected at 204, further mitigating actions are initiated at 206. If the source of the exotherm is identified, various mitigating actions may be taken. For example the temperature sensors 88, 90, 92, and 94 may be used in combination with the oxygen concentrations measured at oxygen sensors located upstream and downstream of the exhaust aftertreatment system to identify the source of an exotherm. In such an example, an expected oxygen amount can be generated for the downstream position of each monitored region, and based on whether the actual oxygen amounts differ sufficiently from the expected oxygen amounts, a position of the unexpected exotherm can be identified.

Further, even if the source of the undesired exotherm is not identified, a plurality of mitigating routines may still be implemented at 206. For example, the temperature sensors 88, 90, 92, and 94 may be used in combination with the oxygen concentrations measured at oxygen sensors located upstream and downstream of the exhaust aftertreatment system to identify a region of the exhaust aftertreatment system even if the source of the undesired exotherm is not identified.

The mitigating routines initiated at 206 may include various adjustments to the engine or aftertreatment system which further limit the oxygen flow in the aftertreatment system, decrease exhaust temperature, or combinations thereof. In one example, the oxygen concentration generated in the exhaust aftertreatment system may be further adjusted in response to exhaust temperature. For example, if an undesired exotherm is indicated in a region of the exhaust aftertreatment system which includes a DPF, the mitigating actions may include decreasing exhaust temperature. In another example, if the undesired exotherm was due to fuel leaking from an injector, then rail pressure may be reduced. Other examples of mitigating actions which may be initiated at 206 when an undesired exotherm is detected at 204 include turning off post injection (in-cylinder and in the exhaust pipe), reducing the maximum torque so as to reduce the amount of fuel in the exhaust, throttling the intake air so as to reduce the oxygen in the exhaust, displaying a message on the cluster display to alert the driver, inducing artificial misfire to alert the driver of an abnormal situation, reducing vehicle speed to reduce the exhaust flow and hence reduce the exotherm, modifying the flow of injected urea, and shutting off the EGR valve to increase the exhaust flow and hence the cooling of the exhaust system. A combination of one or more of the above mitigating actions may be initiated at 206 depending on whether the cause of the exotherm is known. The routine of FIG. 2 may be continuously repeated during engine operation in order to monitor for undesired exotherms occurring in the exhaust aftertreatment devices and initiate mitigating actions when undesired exotherms are detected.

FIGS. 3-5 show various embodiments of the diagnostic routine 202 which monitors for and detects undesired exotherms in the exhaust aftertreatment system in part or as a whole during engine operation. In contrast to the regeneration control routines shown at 200 in FIG. 2 and described above, the diagnostic routines shown in FIGS. 3-5 may indicate undesired exotherms even when the excess oxygen flow is controlled to the desired value at 200. Further, in response to the indication of undesired exotherms by the diagnostic routines shown in FIGS. 3-5, mitigating actions may be initiated even when the source of the exotherm is unknown and/or the particular location of the undesired exotherm is not precisely known. In this way, it is possible to address the risk of undesired exotherms occurring from combustible material in the exhaust reacting with excess oxygen due to primarily lean conditions in exhaust systems, such as diesel systems, when the exhaust is at sufficiently high temperatures.

Turning now to FIG. 3, an example embodiment for monitoring and detecting undesired exotherms in the exhaust aftertreatment system during engine operation based on measured oxygen concentration at a sensor located downstream of at least a portion of the exhaust aftertreatment system is shown. At 300 the oxygen concentration is determined at a point in the exhaust passage upstream of the exhaust aftertreatment system. For example, the oxygen concentration may be determined by an UEGO sensor (e.g., sensor 126 in FIG. 1) located upstream of the exhaust aftertreatment system. Alternatively, the expected oxygen concentration at location 126 may be estimated from air flow and fuel flow. At 302, an expected oxygen concentration at a sensor located downstream of the exhaust aftertreatment system (e.g., sensor 96 in FIG. 1) is determined by applying transport delay and a low-pass filter to the upstream oxygen concentration measured at an upstream oxygen sensor in 300. Transport delay variations may be empirically determined for a given engine and exhaust system design, or modeled based on the engine and exhaust system design, for example. The transport delay and low-pass filter simulate mixing and sensor dynamics and account for any oxygen removal in the upstream catalysts.

The expected oxygen concentration at a sensor located downstream of the exhaust aftertreatment devices determined at 302 from a measured oxygen concentration at a sensor located upstream of the exhaust aftertreatment devices depends on an oxygen depletion amount which may occur in the one or more aftertreatment devices in the exhaust aftertreatment system. The oxygen depletion which may occur in the aftertreatment devices may be empirically determined for a given exhaust aftertreatment system or modeled based on the exhaust system design and the aftertreatment devices within the aftertreatment system. In one example, the oxygen depletion amount may depend on the amount of hydrocarbons or other oxygen-reactive unburned reductants in the exhaust entering the aftertreatment devices. In this example, the hydrocarbons may combust within the aftertreatment system thus depleting oxygen. In another example, the amount of oxygen depletion may depend on the amount of carbon monoxide entering the exhaust aftertreatment system. In this example, the carbon monoxide may react with oxygen to form carbon dioxide thus depleting the oxygen supply in the aftertreatment system. In still another example, a reductant (e.g., HC) may be injected into the exhaust aftertreatment system in order to aid in catalytic regeneration which would cause oxygen depletion to occur in the exhaust aftertreatment system. Thus, in one example, an amount of engine out reductants (which may be a function of engine speed, load, combustion air-fuel ratio, etc.) as well as an amount of external reductant injection, may be used to determine, along with catalyst conditions, exhaust flow rates, etc., an expected oxygen content at one or more locations along the length of the exhaust system, including at the location downstream of the exhaust aftertreatment system Furthermore, the expected oxygen concentration may be based on whether or not a regeneration event is occurring in one or more of the exhaust aftertreatment devices (e.g., DPF regeneration). Specifically, in the example of DPF regeneration, the amount of oxygen expected to be depleted by the DPF regeneration may be determined based on the regeneration rate, temperature, and the amount of stored particulate, for example. As the amount of particulate may decrease during regeneration as it is getting used up, the expected oxygen concentration downstream of the DPF may be based on the amount of stored particulate and based on exhaust temperature, space velocity, and other parameters of the aftertreatment device. In another example, the expected oxygen may be increased in response to a decrease in the regeneration rate.

At 304, a threshold for allowed oxygen differences between the expected oxygen concentration determined in 302 and the oxygen concentration measured by a sensor (e.g., sensor 96 in FIG. 1) located downstream of the exhaust aftertreatment system is determined based on engine operating and exhaust conditions. In one embodiment, the allowed oxygen difference threshold is a function of the exhaust flow and exhaust temperature. For example, for higher exhaust flow, a smaller allowed oxygen difference threshold may be used since the total material burned is proportional to oxygen flow which increases with exhaust flow. The exhaust temperatures may be determined by one or more temperature sensors disposed along the exhaust conduit within the exhaust aftertreatment system (e.g., sensors 88, 90, 92, 94 in FIG. 1). Alternatively, some or all of the exhaust gas temperatures may be modeled. In one example, the allowed oxygen difference threshold may be a function of the maximum of the measured exhaust temperatures.

If the difference between expected oxygen concentration and oxygen concentration determined by the sensor located downstream of the exhaust aftertreatment system is greater than the threshold value at 306, then an undesired exotherm 308 is indicated at 308 and appropriate mitigating actions may be initiation as described above with regard to step 206 in FIG. 2.

In contrast to undesired exotherms occurring in the exhaust aftertreatment system, regeneration events occurring in aftertreatment devices give rise to "expected" exothermic reactions. Thus, when diagnosing undesired or "unexpected" exotherms in the exhaust aftertreatment system at step 306, a method may be employed to distinguish between expected and unexpected exothermic reactions occurring in the exhaust aftertreatment system, for example whether an exotherm is due to a regeneration event or not. Whether or not a regeneration event is occurring in an aftertreatment device may be determined based on various operating conditions and properties of the aftertreatment devices. For example catalyst temperature (e.g., as measured by a temperature sensor), the regeneration rate which may depend on the catalyst, and the amount of particulate stored in the catalyst, which may be modeled. Thus, in diagnosing undesired exotherms based on the expected oxygen concentration as shown in FIG. 3, the routine may determine whether or not regeneration events are occurring in a region of the aftertreatment system. If a regeneration event is identified in a region of the exhaust aftertreatment system which includes particulate trapping (e.g., a region of the exhaust aftertreatment system including a DPF), excess oxygen supplied to the region may be controlled as shown in step 200 in FIG. 2 to control the regeneration rate, and thus limit temperature at or downstream of the region. However, at the same time, if either the region undergoing regeneration, or some other region of the exhaust aftertreatment system, is not getting sufficient excess oxygen as determined by how much oxygen is expected based on modeling or how much oxygen is supplied to the aftertreatment system in the approach of step 200 in FIG. 2, then an unexpected or undesired exotherm is diagnosed at step 308 in FIG. 3.

Thus even if a regeneration event occurs in the exhaust aftertreatment system (e.g., a DPF regeneration event), undesired exotherms may still occur in other locations of the aftertreatment system prompting further mitigating actions. For example, excess oxygen may be limited further in the exhaust to mitigate unintended high temperature regions in the exhaust, which may or may not be in or downstream of the aftertreatment device undergoing regeneration. For example, the unexpected exotherm may be upstream of the aftertreatment device undergoing regeneration.

In one example, if the exhaust aftertreatment system includes a DPF, then the routine may determine whether or not the DPF is regenerating stored particulate (e.g., based on the temperature of the catalyst, the amount of particulate stored, and the rate of regeneration, as described above). If the DPF is undergoing regeneration then an expected exothermic reaction is taking place; thus the routine may monitor the region of the exhaust aftertreatment system which does not include the regenerating DPF to diagnose unexpected exotherms. Thus, in determining the expected oxygen concentration downstream of the DPF based on oxygen concentration entering the exhaust aftertreatment system, the oxygen that is getting used up to react with stored particulate in the regenerating DPF may be subtracted off of the expected oxygen concentration calculation. In another example, if the DPF is erroneously determined to be empty (e.g., due to a miscalculation of how much particulate soot is stored in it, for example), and thus not regenerating, but an unexpected drop in oxygen concentration across the DPF is determined by the routine of FIG. 3, then an undesired exotherm is indicated at 308 and mitigating actions are initiated. Thus, in contrast to the regeneration control routine at 200 in FIG. 2, the diagnostic routine shown in FIG. 3 may indicate undesired exotherms even when faults occur in the control routines.

Turning now to FIG. 4, an alternative embodiment for monitoring and detecting undesired exotherms in the exhaust aftertreatment system during engine operation is shown. At 400 the expected amount of fuel needed to arrive at the oxygen concentration measured by a sensor (e.g., sensor 94 in FIG. 1) located downstream of the exhaust aftertreatment system is determined. The expected amount of fuel may be determined from the oxygen concentration measured at the sensor, the delayed air flow, and the air-fuel stoichiometry. At 402, a threshold for allowed fuel differences between the expected fuel amount and the metered fuel amount needed to arrive at the measured oxygen concentration is determined based on engine operating and exhaust conditions. If the difference between expected fuel amount determined in step 400 and metered fuel amount needed to arrive at the measured oxygen concentration is greater than the threshold value determined at 404, then an undesired exotherm has been detected 406.

Turning now to FIG. 5, another alternative embodiment for monitoring and detecting undesired exotherms in the exhaust aftertreatment system during engine operation is shown. At 500 an expected temperature at a location downstream of each catalyst is determined. The location may be a sensor location, or may be a location away from a sensor, such as within a catalyst brick. Nevertheless, it may be possible to estimate the temperature at this location.

The expected temperature for each aftertreatment device may be determined from the tail pipe oxygen concentration (for example as measured by oxygen sensor 94 located downstream of the exhaust aftertreatment system), the upstream aftertreatment device temperature (as measured by a temperature sensor located downstream of the upstream aftertreatment device, for example), and the exhaust flow. Alternatively, the expected temperature may be based on exhaust flow conditions and oxygen depletion along a length of the exhaust system in a direction of exhaust gas flow of exhaust gas. For example, an expected temperature may be computed based on exhaust flow conditions and oxygen depletion, where the expected temperature may be a modeled in-brick temperature, or between brick temperature, where there is no temperature sensor. Nevertheless, as further explained below, if an inferred temperature at this location (e.g., from nearby temperature sensors) is too high as compared to the expected temperature, an undesired exotherm may be identified.

At 402, a threshold for temperature differences between the expected temperatures and the corresponding measured temperatures (e.g., as measured by temperature sensors) is determined based on engine operating and exhaust conditions. In one example, the difference in expected and measured oxygen concentration at the sensor located downstream of the exhaust aftertreatment system (e.g., as determine in the routine shown in FIG. 3) may be used to set the threshold for temperature differences at 502. In another example, the difference in expected and metered fuel needed to arrive at the oxygen concentration measured by the sensor located downstream of the exhaust aftertreatment system (e.g., as determined in the routine shown in FIG. 4) may be used to set the threshold for temperature differences at 502. Furthermore, some or all of the exhaust gas temperatures may be modeled. If the difference between any of the expected temperatures determined in step 500 and the corresponding measured temperature (e.g., as determined by a temperature sensor located downstream of a given aftertreatment device) is greater than the threshold value determined at 504, then an undesired exotherm has been detected 506.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein. For example, a diagnostic method for diagnosing undesired exotherms in an exhaust aftertreatment system coupled to a combustion engine may comprise identifying an undesired exotherm based on an expected temperature at an oxygen sensor location; and initiating mitigating actions in response to an identified undesired exotherm. The expected temperature may be based on exhaust flow conditions and oxygen depletion along a length of the exhaust system in a direction of exhaust gas flow of exhaust gas.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:

identifying an undesired exotherm in an exhaust aftertreatment system coupled to the engine based on an expected oxygen depletion along a length of the exhaust system in a direction of exhaust gas flow of exhaust gas, the aftertreatment system including an oxidation catalyst, SCR catalyst, and particulate filter; and initiating mitigating actions in response to an identified undesired exotherm.

2. The method of claim 1, wherein the identifying includes indicating the undesired exotherm based on a difference between an expected oxygen concentration and an oxygen concentration measured at a sensor located downstream of said exhaust aftertreatment system.

3. The method of claim 2 wherein the expected oxygen concentration is based on a regeneration rate of the particulate filter region in the exhaust aftertreatment system, during regeneration of the particulate filter region.

4. The method of claim 2 wherein the expected oxygen concentration is based on an amount of unburned reductants exiting the engine during lean combustion.

5. The method of claim 2 wherein said indication is based on whether the difference is greater than a threshold value, the threshold based on engine and exhaust conditions.

6. The method of claim 1 further comprising adjusting an oxygen concentration generated in an exhaust of the engine in response to exhaust temperature.

7. The method of claim 1 further comprising identifying the undesired exotherm based on an expected fuel used to arrive at a measured oxygen concentration at a sensor location downstream of said exhaust aftertreatment system.

8. The method of claim 1 further comprising identifying the undesired exotherm based on an expected temperature at an oxygen sensor location, where the expected temperature is computed based on exhaust flow conditions and the oxygen depletion.

9. A method for diagnosing undesired exotherms in an exhaust aftertreatment system, the aftertreatment system having at least a first region including particulate filter trapping and regeneration and a second region, including an oxidation catalyst and a SCR catalyst, without particulate filter trapping, the system coupled to an engine, the method comprising:

during regeneration of the first region:

adjusting an engine operating condition in response to an oxygen concentration downstream of the aftertreatment system to maintain a desired oxygen concentration downstream of the aftertreatment system; and indicating an undesired exotherm in the second region, including the oxidation catalyst and a SCR catalyst, based on a difference between an expected oxygen concentration and the oxygen concentration downstream of said exhaust aftertreatment system; and initiating mitigating actions in response to said indicating of the undesired exotherm.

10. The method of claim 9 wherein the first region includes a DPF, and wherein the mitigating actions include decreasing exhaust temperature.

11. The method of claim 9 wherein the expected oxygen concentration is based on an amount of particulate stored in the first region.

12. The method of claim 11 wherein the expected oxygen is increased in response to a decrease in a regeneration rate of the first region.

13. A method for diagnosing undesired exotherms in an exhaust aftertreatment system coupled to a combustion engine, the method comprising:

determining an expected temperature at a location downstream of a first catalyst, based on an oxygen concentration measured at a sensor located downstream of the first catalyst, a measured temperature upstream of the first catalyst and downstream of a second catalyst, and the exhaust flow;

determining a threshold for the difference between the expected temperature and the measured temperature based on engine and exhaust conditions;

indicating an undesired exotherm if the difference between the expected temperature and the measured temperature is greater than the threshold; and initiating mitigating actions in response to said indicating of the undesired exotherm, the exhaust aftertreatment system including an oxidation catalyst, SCR catalyst, and particular filter.

14. The method of claim 13 wherein said threshold is based on a difference between an expected oxygen concentration and the oxygen concentration downstream of said exhaust aftertreatment system.

15. The method of claim 13 wherein said threshold is based on an expected fuel used to arrive at a measured oxygen concentration at the location downstream of said exhaust aftertreatment system.

16. The method of claim 15 wherein the location is a sensor location.

17. The method of claim 13 wherein the location is within a brick of the exhaust aftertreatment system.

* * * * *